United States Patent
Kisel et al.

(10) Patent No.: US 9,661,099 B2
(45) Date of Patent: May 23, 2017

(54) RESOURCE ARBITRATION IN A CONVERGED MULTI-MEDIA ENVIRONMENT

(75) Inventors: Andrey Kisel, Berkshire (GB); Dave Cecil Robinson, Wiltshire (GB); Tiaan Schutte, Voorschoten (NL)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 12/356,214

(22) Filed: Jan. 20, 2009

(65) Prior Publication Data

US 2009/0185576 A1 Jul. 23, 2009

(30) Foreign Application Priority Data

Jan. 21, 2008 (EP) .................................. 08290051

(51) Int. Cl.
| | |
|---|---|
| H04L 12/58 | (2006.01) |
| H04L 29/08 | (2006.01) |
| H04L 12/54 | (2013.01) |
| H04L 12/927 | (2013.01) |
| H04L 12/911 | (2013.01) |

(52) U.S. Cl.
CPC ........ H04L 67/306 (2013.01); H04L 12/5695 (2013.01); H04L 47/808 (2013.01); H04L 47/824 (2013.01)

(58) Field of Classification Search
None
See application file for complete search history.

(56) References Cited

U.S. PATENT DOCUMENTS

| | | | |
|---|---|---|---|
| 6,728,784 B1 | 4/2004 | Mattaway | |
| 2004/0049574 A1* | 3/2004 | Watson et al. | 709/224 |
| 2004/0174830 A1* | 9/2004 | Koskelainen et al. | 370/260 |
| 2006/0224432 A1* | 10/2006 | Li | 705/9 |
| 2007/0057044 A1* | 3/2007 | Uchiyama et al. | 235/380 |
| 2007/0140299 A1* | 6/2007 | Hofmann et al. | 370/486 |
| 2007/0265031 A1* | 11/2007 | Koizumi et al. | 455/556.1 |
| 2007/0288627 A1 | 12/2007 | Abella et al. | |
| 2008/0152110 A1* | 6/2008 | Underwood et al. | 379/142.16 |
| 2009/0006247 A1* | 1/2009 | Hansen et al. | 705/39 |
| 2009/0028307 A1* | 1/2009 | Kister et al. | 379/93.03 |
| 2009/0119772 A1* | 5/2009 | Awad et al. | 726/21 |
| 2009/0328118 A1* | 12/2009 | Ravishankar | H04M 3/42042 725/106 |
| 2010/0100943 A1* | 4/2010 | Pacholec et al. | 726/4 |

OTHER PUBLICATIONS

Alcatel, "Delivering True Triple Play," "Composite Applications and the Role of SIP," XP-002418651, pp. 1-6, (retrieved Feb. 6, 2007).
Alcatel, "Delivering True Triple Play," "Common Capabilities for the Delivery of Composite Services," XP-002418653, pp. 1-12, (retrieved Feb. 6, 2007).
European Search Report.

* cited by examiner

*Primary Examiner* — Zewdu A Beyen
(74) *Attorney, Agent, or Firm* — Fay Sharpe, LLP

(57) ABSTRACT

A data communication system, comprising an access control agent arranged on a network to allocate network resources on one or more UE (user equipment) devices on the network according to one or more parameters, the access control agent being remote from the UE.

18 Claims, 1 Drawing Sheet

(Football Match 'Paused')

RESOURCE ARBITRATION IN A CONVERGED MULTI-MEDIA ENVIRONMENT

This invention relates to resource arbitration in a converged multi-media environment. In particular, it relates to an arbitration system by which decision can be made as to which type of multi-media content a user is presented with and how this a dealt with by a network.

There is an increasing need for converged data and information systems which can adapt multi-media and communicational services to user lifestyle. For example, a user of a device commonly requires to be able, from a single device or user equipment (UE) to receive and respond to email, SMS, initiate a call from a buddy list, watch traditional TV services or video on demand (VoD), play games and so on.

Many different types of communicational and information services can be delivered to an IPTV UE. These include, for example, SMS, MMS, IMS-IM, VOIP calls, IMS features, RSS feeds, email, calendar functionality, various types of instant messaging services such as ISM, Google talk, Internet notifications, games and many others. Service operators are particularly interested in offering converged solutions which enable a user to receive a large number of these different services. In a converged solution, when the UE is faced with multiple concurrent multi-media sessions, for example, an SIP call, a VOD session and an email presentation, the UE needs to arbitrate and share access to shared resources. These resources may be, for example, a TV or other display screen, a media decoder, speakers, storage means and so on.

Methods are required for arbitrating access to shared UE resources.

Present solutions to this most commonly use an IPTV application on a UE which can assume complete control of all the UE devices. Existing 'converged' solutions use a gateway from a notification or information source. The gateway delivers notifications to the IPTV UE. The UE includes multiple enablers for each type of service and applications sharing access to the device via an abstraction layer of common APIs (application programming interfaces). Each application has to be aware of other applications to share access in a presentable and managed way. For example, in the case of email provided on a TV, the email can be delivered either directly or via a gateway to the UE using POP3, IMAP, SMTP or other and a built-in email client on the UE requests permission to overlay the text over a video picture on the screen via common APIs. Another example is when an IMS SIP (session initiation protocol) call is made to an IPTV UE. A session set up is negotiated via a built-in call client on the UE and, when the audio is delivered, the built-in call client requests, via a common API, to take exclusive or blending use of the speakers on the UE system.

A problem with this type of system is that it requires a separate service for each service type to be provided on the UE and to be aware about rules for accessing common resources (device) on the UE. This creates several limitations:

External non-static factors such as policies, presence, profiles and activities cannot be factored into the decision of how resources are to be allocated. For example, rules for handling a VOIP call coming from a buddy chatting about a watched football match can be very different from rules for handling incoming VOI calls from an office or other work environments. The first may want to include football match commentary in the background while the discussion is going on while the second one may not.

A new client and processing logical is required, at the UE, for each new service type, even if the underlying delivery mechanisms are the same.

The applications need to be written with the knowledge of each other; and

There is no simple way of customising and changing rules after applications are deployed to the UE.

The present invention arose in an attempt to provide an improved arbitration system.

According to the present invention there is provided a data communication system, comprising an access control agent arranged on a network to allocate network resources on one or more UE (user equipment) devices on the network according to one or more parameters, the access control agent being remote from the UE.

Preferably, the access control agent allocates resources according to the type and nature of resource being required and according to one or more of profiles, presence, personalisation, policies or other information.

The UE may be IPTV equipment (which may for example be connected to a closed IP network, or the Internet) or any mobile or static terminal adapted to be connected to a wireless (eg GPRS, UMTS or other wireless) network or a fixed line network to communicate with other devices.

The invention allows an access control agent to be provided 'locally' in a network or at the back end of a network and to thereby remove the requirement for a UE to have facilities to make initial decision logic as to how UE use available at the UE are to be used for various types of multi-media or other content.

The decision as to how resources may be used may be delegated to the access control agent. The agent can access and evaluate, if needed, profile information, presence information, personalisation, including buddy lists associated with the user of a UE, general or specific policy and information via standard or specific interfaces prior to assigning resources for a given multi-media session.

The UE may have a number of resources available such as a display apparatus, speakers, microphone or microphone input, use of various data input/output devices and so on. Control of any of these resources can be allocated, at least in part, by the access control agent.

Furthermore, access to shared resources (UE physical devices) may be reused via abstraction layer of common UE APIs.

A notification agent may be provided in the network, again preferably remote from the UE for providing notifications to the UE of initial data requests/transmission and the notification agent may be as disclosed in co-pending application, agents reference number 15351EP, which can receive notification from a plurality of sources each using a particular protocol and providing these notifications to the UE over a common protocol and with common look and feel. The notification agent can be linked, or form part of the access control agent so that maximum use is made of central or local network resources and minimising the logic and software resources required at the UE.

The invention further provides a method of arbitrating and allocating resource use of a UE provided on a network comprising, when a request arises to use one or more resources, causing an access control agent provided remotely from the UE to allocate and arbitrate resource use at the UE according to one or more parameters.

The invention further provides an access control agent comprising means for allocating resources available to one or more remote UE devices on a network according to one or more parameters.

The invention also provides a system or method including any one or more of the novel features, combinations of features, steps or combination of steps disclosed herein.

Embodiments of the invention will now be described, by way of example only, with reference to the accompanying schematic drawings in which.

Figure 1:
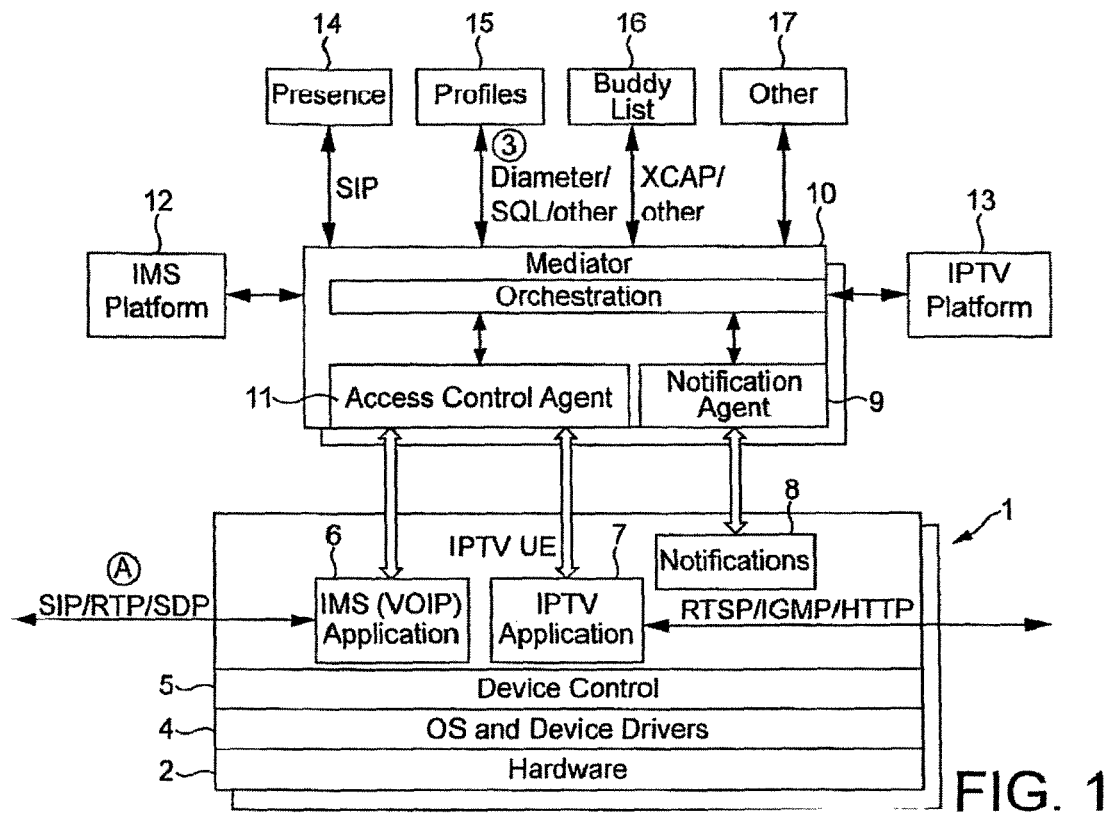
FIG. 1 shows schematically part of a network.

Referring to FIG. 1, an embodiment of the invention is shown schematically. A UE 1, in this case a IPTV UE (set-top box plus display for example) is connected to a network to receive data of many different types from the network. As shown in the figure, the UE 1 comprises several components.

It comprises hardware 2 which, dependent upon the nature of the UE will be a processor, data storage hardware (solid state and/or hard disk for example), a display, one or more input/output means such as keyboards, touch-screen, input, mouse, touch pointer and so on and, for multi-media use, one or more loudspeakers 2 (FIG. 2) and a microphone and/or microphone input. Various levels of software are also included. These may comprise an operating system and device drivers 3, a device control layer 5 and some more specific applications which are, in this case, an IMS (VOIP) application agent 6 and an IPTV application 7. There may also be include a further agent 8 adapted to receive notifications from an notification agent 9 provided remotely on the network and most preferably these operate together in the manner disclosed in co-pending application reference 15350EP.

The IMS (VOIP) application 6 relates to generally voice-type applications using, for example, session initial protocol (SIP), real-time protocol (RTP) and session description protocol (SDP) multi-media sessions. The data may be audio and/or video data.

The IPTV application can use protocols such as real-time streaming protocol (RTSP), internet group management protocol (IGMP) or HTTP. This can be used for video data, video broadcast (by means of IP multicast), video on-demand programme or other material using the set top box 1.

Other types of application layout protocols and/or agent can be used.

At the network level there is provided a mediator 10 which includes said notification agent 9. The mediator also includes an access control agent (ACA) 11 and an orchestration agent (in effect controller or workflow agent) 1. This also links to various data/communication platforms such an IMS platform and an IPTV platform 13. The mediator can also access external information which can either be specifically related to the user of the UE or may be more general information, such as presence 14, profile 15, a buddy list 16, or other information 17.

The UE VOIP application 6, when triggered by either an incoming VOIP call setup A or by user action, requests access for the mediator 10 (access control agent 11) prior to requesting device access via the common device control API 5. It contacts the access control agent 11 over the network.

Note that the application will need to determine access to shared resources only once during a session/service initialisation and this will not cause degradation to the user experience during the actual service delivery.

The mediator (access control agent) can then access the external information 14 to 17 before determining an access level to the shared resources. Because the agent is located within the network rather than at the UE, the same access control agent 11 can be shared between multiple clients or UEs reusing the access interfaces and enabling caching. For example, user profile, presence and some service data can be cached and reused when requested from multiple UEs trying to set up a video call or a chat sessions on a TV watching a football match.

The access control agent 11 may use external configurable workflow or pluggable decision logic to determine device access, if some conditional steps are required. Low cost implementation of orchestration on the UE may be achieved. For example, in response to an initial VOIP call A or email request, the access control agent 11 may request an IPTV platform 13 to pause streaming video which it has previously been transmitting to the UE, or to initiate a time shifting feature.

The access control agent returns, to the application 6 or 7, the access permission and level. The UE application then requests access to the UE device with the granted access level. Examples will now be given to clarify this and these examples are illustrative only of many different examples and embodiments of the invention.

Figure 2:
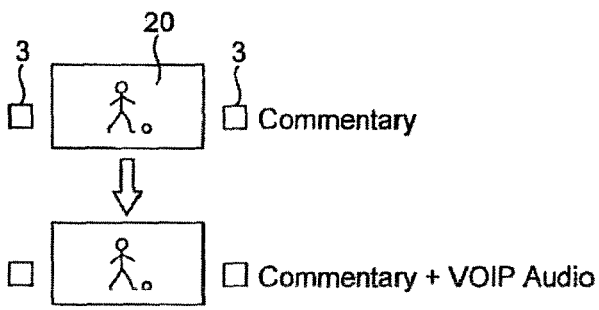
FIG. 2 shows an explanatory diagram of a first example of use.
Figure 3:
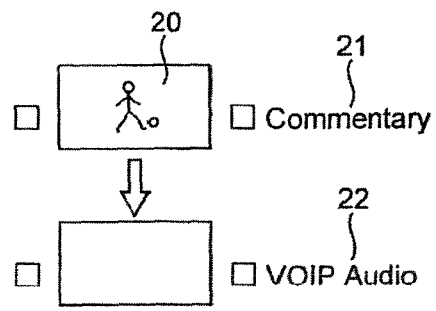
FIG. 3 is an explanatory diagram of a second example of use.

A first set of scenarios is shown in FIGS. 2 and 3. This relates to an incoming VOIP call where the user is watching a football match 20 on a display and the commentary of the match is being relayed through a pair of loudspeakers 3. The access control agent can allow for different handling of different types of VOIP calls.

In a first example, the IPTV application has a user selected option to accept an incoming call from the notification agent 9 (as described in more detail in co-pending application 15350EP). A SIP invite arrives and audio is delivered to the UE via RTP for example. During an initial set-up time the application makes a request to the ACA 11 to request access to particular resources on the UE, in particular to audio speakers 3 and a microphone. The ACA checks presence 14, that is, checks the presence of the originator of the VOIP call. If it determines that the incoming call is from someone on the 'buddy list' 16 of the user of that particular UE 1 and that the originator is watching the same football match, then it may grant shared access for example. This means, in effect, that the football match can still be viewed and the commentary listened to in real-time whilst the incoming audio from the VOIP call is overlaid. The application therefore overlays audio over an (attenuated) match commentary in the background. This is shown in the second part of FIG. 2 where the sound emanating from the speakers 3 is representative of the commentary plus the VOIP audio. The commentary will usually be attenuated so that the VOIP audio can be heard more clearly.

If it is alternatively determined that the incoming VOIP call is coming, for example, from the workplace of the user, or from the user's child at school, then it may be more important that the user devotes his full attention to the message. In this case, exclusive access to the audio and microphone is granted. This is shown in FIG. 3. Initially the football match 20 is viewed and the commentary 21 is output from the speakers.

In these more important situations determined above, then the VOIP audio 22 alone 22 is output from the speakers without any commentary. The football match or other IPTV program can optionally be cancelled or paused based on presence of profile. FIG. 3 shows in its second part, how the football match is cancelled from the screen so that the user can give his full attention to the VOIP call. However, the match might alternatively be simply paused on the screen. Optionally, the ACA may trigger orchestration to deliver additional information during the call, eg a web page. Or a reference to a web page, containing contact details of the calling person, notes associated with the calling person, etc.

Figure 4:
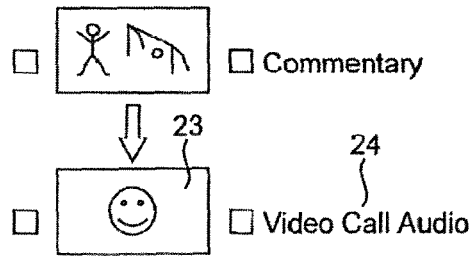
FIG. 4 is an explanatory diagram of a third example of use.

In a further scenario illustrated schematically in FIG. 4, the user of the IPTV system is again watching a football match and, in this case, decides to make a video call. From the IPTV video call application, the user selects to make a call to a buddy of his from his 'buddy list'. The video call application accesses the ACA 11, which retrieves the profile 15 for the buddy. In this case, the ACA determines that both the video call and the VOD session (live football match) cannot be handled simultaneously. It therefore denies access from the IPTV application to video/audio resources during the call. The video application stops the video and control is passed exclusively to the video call application. Thus, the user can now view the person he talking to on the video call 23 and the audio from the video call is output through the speakers 24.

Many examples will, of course, be apparent. Note that in these examples, access to shared UE resources are personalised for particular user circumstances. In addition, the respective applications do not need to be aware of each other at all since the access level given to the UE by the access control agent are determined by the ACA agent and not by the UE itself.

The ACA can offer access rights based upon external conditions in some embodiments of the invention. That is, it can deny video for a video application, deny audio, deny right access to disk and so on. This may occur if the particular device is needed for other higher priority services, such as VOIP call from a child, presentation of an SMS or other purposes. One particular example is where a high bandwidth video call is originated or required to be set up.

Quality of service (QoS) may be another parameter that determines resource allocation. For example, if the originator of a call or data request is a 'premium' customer, then the ACA may be able to automatically request a higher QoS and to be able to grab higher access to the hardware and software resources on the UE than for a less premium customer. Other factors such as user preferences, bits rate/resolution of video call or simply a measure of whether one type of service requirement is more important (via various criteria) than another may be used to make the determination. For example, if the content of a video call is more important than a particular VOD broadcast being viewed at any time. Is the originator of a call more important than the VOD and so on. When two competing services are competing for resources, then the access control agent can be used to determined which of these uses the resources or gain a higher level of use.

In effect, the responsibility for determining a certain level of services and determining the allocation of resources is removed from the UE and moved up to the access control agent which is positioned remotely on the network. The access control agent liaises with external systems to decide this.

Many different rules and scenarios will be apparent.

Note that in embodiments of the invention, the UE does not need to know how to access different external sources of information (presence, profile, buddy list, etc), which often require different access interfaces. Instead it needs to communicate to a single ACA, thus moving complexity from the UE up to the network. The ACA then handles these communications.

The invention claimed is:

1. A data communication system, said data communication system comprising:
    an access control agent arranged on a network; wherein said access control agent determines access rights for one or more applications in response to at least one of said one or more applications requesting access to one or more shared resources on a UE (user equipment) device according to at least one of a type and a nature of one or more of the resources to which access is being requested, the access control agent being remote from the UE, said one or more applications being resident on said UE and said UE being served by the network; and
    wherein the determined access rights include: (i) a permission to access one or more of the shared resources; and (ii) a designation of one or more different levels of access to shared resources being shared concurrently.

2. The system as claimed in claim 1, wherein the access control agent determines access rights to allocate resources according to one or more of profiles, presence, personalization, or policies.

3. The system as claimed in claim 1, wherein the UE is IPTV equipment.

4. The system as claimed in claim 1, wherein the access control agent makes decisions based on one or more of profile information, presence information, personalization, including buddy lists associated with the user of a UE, general or specific policy and information via standard or specific interfaces prior to assigning resources for a given multi-media session.

5. The system as claimed in claim 1, wherein the shared resources comprise any one or more of a speaker, a display, a microphone, a microphone input, a data device and a data output device.

6. The system as claimed in claim 1, further including a notification agent adapted to receive notification from a plurality of sources each using a particular protocol and providing these notifications to the UE over a common protocol.

7. The system as claimed in claim 1, wherein the access control agent is shared between a plurality of UEs, and including a cache for caching data.

8. The system as claimed in claim 2, wherein external data sources, remote from the UE, are accessed to determine the profile, presence, personalization or policy information.

9. The system as claimed in claim 1, wherein the access control agent determines access right to applications, wherein a right determined includes a level of access that is different between applications of shared resources when one is determined to have a higher priority based on the parameters.

10. An access control agent arranged on a communications network, said access control agent comprising:
    at least one hardware processor, said processor being provisioned to determine access rights for one or more applications in response to at least one of said one or more applications requesting access to one or more shared resources of at least one of UE (user equipment) devices according to at least one of a type and a nature of one or more of the shared resources to which access is being requested, said at least one of UE devices being served by the network;

wherein the access control agent is remote from said at least one of UE devices and said applications are resident on said at least one of UE devices; and wherein the determined access rights include: (i) a permission to access one or more of the shared resources; and (ii) a designation of one or more different levels of access to one or more of the shared resources being shared concurrently.

11. The access control agent as claimed in claim 10, adapted to allocate resources according to one or more of profiles, personalization, policies or other information.

12. A method of arbitrating and allocating resource use of a UE (user equipment) provided on a network, said method comprising:

detecting when requests arises from one or more applications resident on the UE to use at least one of one or more shared resources of the UE; and in response to detecting said requests, causing an access control agent provided remotely from the UE to determine access rights for the requesting one or more applications to the at least one of one or more shared resources of the UE for which use is being requested according to at least one of a type and a nature of the at least one of one or more shared resources for which use is being requested;

wherein the determined access rights include: (i) a permission to access the at least one of one or more shared resources for which use is being requested; and (ii) a designation of one or more different levels of access to the at least one of one or more shared resources for which use is being requested in a case where said at least one of one or more shared resources for which use is being requested is used concurrently by a plurality of applications.

13. The method as claimed in claim 12, wherein the UE is an IPTV device.

14. The method as claimed in claim 12, wherein the access control agent further determines access rights according to parameters, the parameters include one or more of profile, presence, personalization and policy, and are provided to the access control agent from sources remote to the UE.

15. The method as claimed in claim 14, wherein access to UE resources is revised via an abstraction layer of common UE application programming interfaces.

16. The method as claimed in claim 12, wherein initial notifications to a UE are handled by a notification agent, remote from the UE, which communicates with a plurality of notification sources each using a particular profile and provides these notifications to the UE over a common protocol.

17. The method as claimed in claim 12, wherein the access control agent is adapted to deliver additional information to a UE.

18. The method as claimed in claim 17, wherein the additional information is delivered as a web page or reference to a web page.

* * * * *